April 13, 1965 S. S. DE MARCO 3,177,609
ELECTRICAL EXTERMINATOR FOR INSECTS
Filed April 17, 1963 2 Sheets-Sheet 1

INVENTOR.
Samuel S. De Marco

United States Patent Office 3,177,609
Patented Apr. 13, 1965

3,177,609
ELECTRICAL EXTERMINATOR FOR INSECTS
Samuel S. De Marco, 156 Airdrie Road, Toronto,
Ontario, Canada
Filed Apr. 17, 1963, Ser. No. 273,662
1 Claim. (Cl. 43—112)

This invention relates to improvements in insect exterminators, and, more particularly, to improvements in electrical exterminators for insects.

It is well known in the art to utilize high voltage electricity to bring about the destruction of insects, and it is usual to employ two spaced apart metal grids which are placed in series in a high voltage electrical circuit so that, upon an insect or the like passing through these grids the gap is temporarily bridged, the insect being electrocuted and, due to the nature of the electrical current, usually burned to an ash.

Such devices are often clumsy and potentially dangerous. Furthermore, they are often not suited to mass production and therefore are not readily available to the general public, and are often not acceptable to the public because of their general appearance.

It is an object of the present invention to provide an electrical exterminator for insects, to be hereinafter known as an exterminator, which is both compact and neat and which presents a generally pleasing appearance making it suitable for use in almost any setting.

Another object of the invention is to provide an exterminator wherein all the component parts may be produced and assembled quite easily by existing mass production methods and which, therefore, may be made readily available to the public at a reasonable cost.

Still a further object of the invention is to provide an exterminator which is completely safe to anyone handling it even when the elements are live.

These and other objects and features of the invention will become apparent when the following description is read in conjunction with the accompanying drawings, in which.

Figure 1:
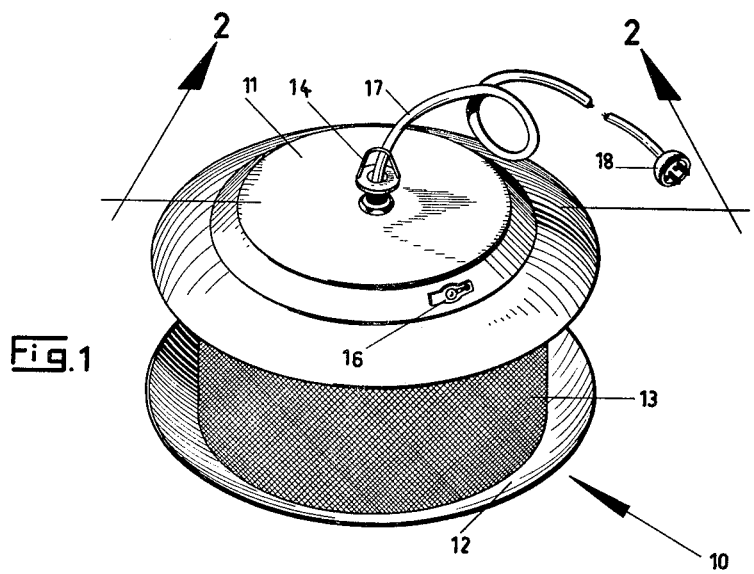
FIG. 1 is a perspective view of an exterminator embodying the present invention.

Referring to FIG. 1, an exterminator 10 includes an upper cover plate 11, a lower cover plate 12 and a grid assembly 13 extending therebetween.

In this particular instance, plates 11 and 12 are circular and grid assembly 13 is cylindrical but for particular installations the invention also is intended to be equally applicable to semi-circular and quadrantal configurations. A suspension eye 14 is attached to a centre conduit 15 on the upper surface of upper plate 11 and serves as a support for unit 10 upon it being required to hang said unit from a ceiling or the like.

A switch 16 is also located to one side on upper plate 11 and is adapted to permit unit 10 to be switched on or off as desired, while an electrical cable 17 is adapted to pass into the unit through conduit 15 to supply the necessary electrical power thereto, the opposite end of cable 17 supporting a standard electrical plug 18.

Figure 2:
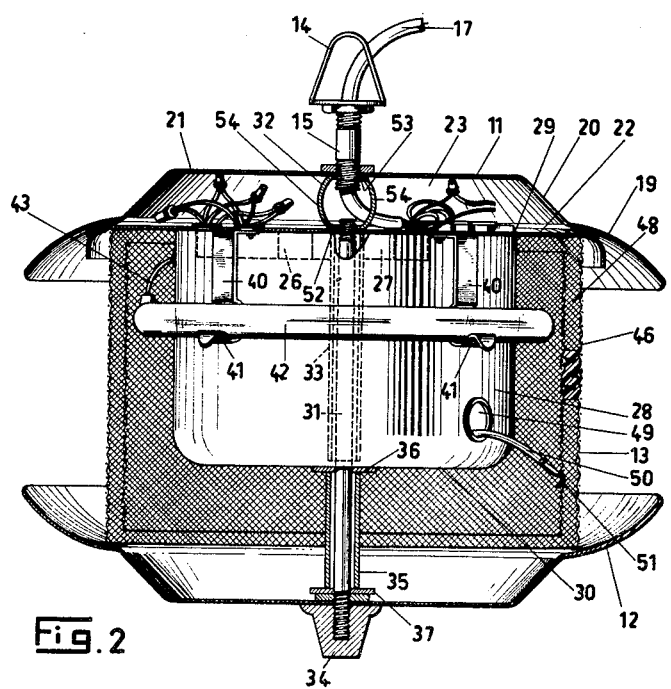
FIG. 2 is a sectional side elevation of the exterminator illustrated in FIG. 1 taken on the line 2—2.
Figure 3:
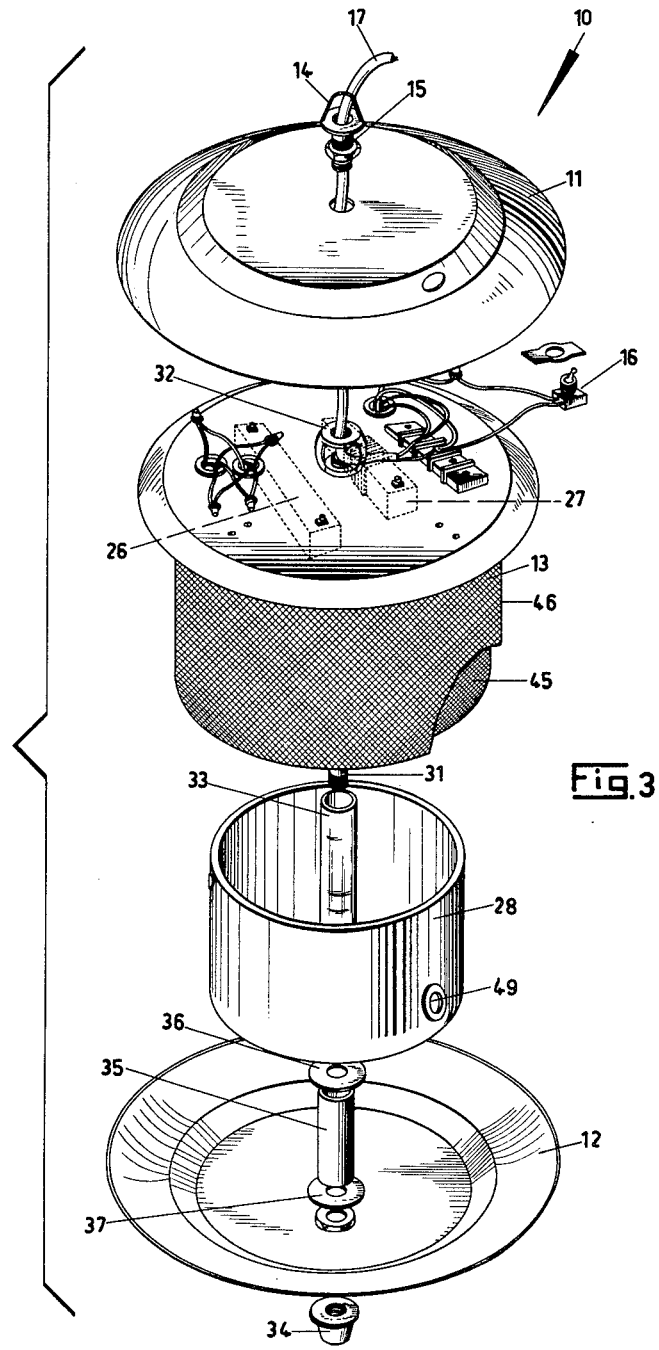
FIG. 3 is an exploded view of the exterminator shown in FIGS. 1 and 2.

Referring to FIGS. 2 and 3, it will be noted that upper and lower cover plates 11 and 12 are of similar configuration in size, upper plate 11 having an outermost, shallow dished rim 19 and a more deeply dished centre portion 20, the upper wall 21 being, in this instance, flat.

A support plate 22 extends across the deeper dished portion 20 of upper plate 11 to rest on the edges of the rim 19 thereby creating a totally enclosed housing 23.

A ballast 26 for use with fluorescent lamps is affixed to the under surface of support plate 22 by conventional screws and a transformer 27 is similarly attached to the under surface of support plate 22, the transformer 27 being adapted to convert the electricity from a household supply to an extremely high voltage current.

A cylindrical cove 28 encloses ballast 26 and transformer 27, cover 28 being open at its upper end, the upper edge 29 being adapted to contact the undersurface of support plate 22, while the lower end of cover 28 is enclosed by an end wall 30.

A hole formed centrally in end wall 30 permits a centre securing bolt 31 to pass axially through cover 28. Bolt 31 is threaded at its upper end and passes closely through a centre hole in support plate 22 to engage a nut unit 32.

A spacer sleeve 33 is assembled around bolt 31 inside cover 28 and extends between plate 22 and end wall 30 of cover 28.

Bolt 31 also extends below cover 28 for a sufficient distance to permit it to pass centrally through lower cover plate 12, the lower end of bolt 31 also being threaded to accommodate a cap nut 34.

A distance piece 35, in combination with suitable plain washers 36 and 37 at the upper and lower ends respectively are also assembled on bolt 31 between end wall 30 of cover 28 and lower cover plate 12 so that, upon tightening cap nut 34, the whole assembly of lower cover plate 12 and cover 28 is held rigidly upon support plate 22.

A plurality of flat, outwardly hooked hangers 40 depend from support plate 22, being attached thereto by screws or the like, and located around the outside of cover 28 at regularly spaced intervals, their hook portions 41 being adapted to support a circular neon lamp 42. The side wall of cover 28 is, of course, suitably perforated to permit the electrical supply wires 43 to pass therethrough to interconnect ballast 26 and lamp 42.

Grid assembly 13 comprises an inner grid 45 and a concentric, spaced apart outer grid 46. The two grids are maintained in their spaced apart condition by means of a plurality of dielectric blocks 47 located in the annular space 48 therebetween. Each grid is separately attached to blocks 47 so that the latter also serves to locate the grids axially in relation to each other.

Outer grid 46 is longer than inner grid 45, overlapping grid 45 both at the top and the bottom edges. Outer grid 46 is adapted to extend between lower cover plate 12 and support plate 22 upon the assembly of plate 12 and cover 28 to support plate 22 by means of bolt 31 and nut 34 as previously described. Inner grid 45 is sufficiently short at each end to prevent any current leakage between it and plates 12 and 22.

A hole 49 is formed through the side wall of cover 28 below transformer 27 to permit an insulated cable 50 carrying a connector claw 51 to pass therethrough, thereby placing inner grid 45 in direct electrical connection with the live side of transformer 27. Outer grid 46 is, of course, connected to a common ground.

Switch 16 being in series in the supply line 17 will permit the unit to be switched off when not required for use, or for servicing or the like.

It will be noted that all the wiring connections from cable 17 to ballast 26 and transformer 27 are contained in housing 23.

Nut unit 32 comprises a lower nut plate 52, into which the upper end of bolt 31 is screwed, and an upper nut plate 53 held spaced apart by a pair of arms 54. Upper conduit 15 is adapted to screw into upper nut plate 53 which is located contiguous with the undersurface of upper cover plate 11.

From the foregoing description and drawings it will be obvious to one skilled in the art that the component parts of my invention are easily fabricated and assembled, and once assembled and connected, the outer grid 46 is itself, completely safe to touch, and protects inner grid 45, only insects small enough to pass through the mesh of the grid being able to enter space 48 and their presence thereafter being sufficient to bridge the gap between grids 45 and 46, causing an arcing which is of sufficient intensity both to kill and incinerate the insect.

Neon lamp 42, of course, is adapted to provide illumination and also to attract insects, so that upon placing my invention in, say, a room, flies, mosquitoes and the like are fatally attracted to it, and the room is rapidly cleared of such insects.

The general design of the individual parts of the invention as explained above may be varied according to requirements in regards to manufacture and production thereof, while still remaining within the spirit and principle of the invention, without prejudicing the novelty thereof.

The embodiments of this invention in which an exclusive property or privilege is claimed are defined as follows:

An electrical exterminator and lure for insects including an upper cover plate and a lower cover plate, an electrically conductive grid assembly comprising an inner cylindrical grid and an outer cylindrical grid in substantially concentric relation, said outer grid extending between said upper and lower cover plates and bearing against said lower cover plate, said inner grid being shorter than said outer grid and having its ends spaced apart from each of said cover plates, said inner grid being held in position by dielectric blocks fixed to the outer surface of the inner grid and the inner surface of the outer grid, a top support plate positioned between the upper end of said outer grid and said top cover plate, an annular light bulb positioned coaxially within said grid assembly and held in position by at least one hanger device fixed to said top support plate, transformer means fixed to said top support plate, a cylindrical transformer cover positioned coaxially with and within said cylindrical grids and covering said transformer means, an electrical supply to said transformer, said transformer providing a high tension circuit, said grids being included in series in said circuit, said outer grid being on the ground side of said circuit, a longitudinal rod assembly threaded at its lower end and positioned centrally of the exterminator and releasably inter-connecting said upper cover plate, said top support plate and said lower cover plate, a spacer sleeve carried on said rod assembly and extending between said lower cover plate and said transformer cover whereby said rod assembly also holds said cover over said transformer, and a single cap nut engaged on said threaded lower end of said rod assembly whereby the exterminator may be substantially fully dismantled by removal of said cap nut.

References Cited by the Examiner

UNITED STATES PATENTS

| 1,960,084 | 5/34 | Folmer et al. | 43—112 |
| 1,985,921 | 1/35 | Folmer | 43—112 |
| 2,589,760 | 3/52 | Zelt | 240—51.12 |
| 3,041,773 | 7/62 | Gagliano | 43—113 X |

FOREIGN PATENTS 25,121  8/22  France.

ABRAHAM G. STONE, *Primary Examiner.*

ALDRICH F. MEDBERY, *Examiner.*